Jan. 8, 1952 A. G. PINCUS 2,581,440
ABSORBING GLASSES AND METHOD OF MAKING SAME
Filed July 3, 1948 2 SHEETS—SHEET 2

INVENTOR.
ALEXIS G. PINCUS
BY
Louis L. Gagnon
ATTORNEY

Patented Jan. 8, 1952

2,581,440

UNITED STATES PATENT OFFICE 2,581,440

ABSORBING GLASSES AND METHOD OF MAKING SAME

Alexis G. Pincus, Worcester, Mass., assignor to American Optical Company, Southbridge, Mass., a voluntary association of Massachusetts Application July 3, 1948, Serial No. 36,975

15 Claims. (Cl. 106—52)

This invention relates to glass compositions and more particularly to glasses which are controlled as to index of refraction, ultra-violet absorption, total energy transmission, visual transmission and color and method of making the same whereby the resultant glass will have desirable working and fusing characteristics with respect to other standard ophthalmic glasses formulated for this purpose.

One of the principal objects of the invention is to provide a glass having a green color and controlled as to its limits of transmission of the blue and yellow portions of the spectrum while possessing controlled indices of refraction, ultra-violet absorption, total energy transmission, and visual transmission and method of making the same whereby the said glass may be more inexpensively fabricated and its resultant color may be more uniformly controlled.

Another object is to provide a glass of the above character which may be formed with less critical, more readily available absorbing ingredients.

Another object is to provide a glass of the above character which will readily fuse with commercially known ophthalmic flint, barium, and crown glasses.

Another object is to provide a glass of the above character which may readily be reworked without danger of devitrification, particularly at the interface, when fusing said glass to ophthalmic flint, barium or crown glass.

Other objects and advantages of the invention will become apparent from the following description and it will be apparent that changes may be made in the specific compositions and methods of making the same without departing from the spirit of the invention as expressed in the accompanying claims. I, therefore, do not wish to be limited to the exact compositions and methods described as the preferred forms only have been given by way of illustration.

Figure 1:
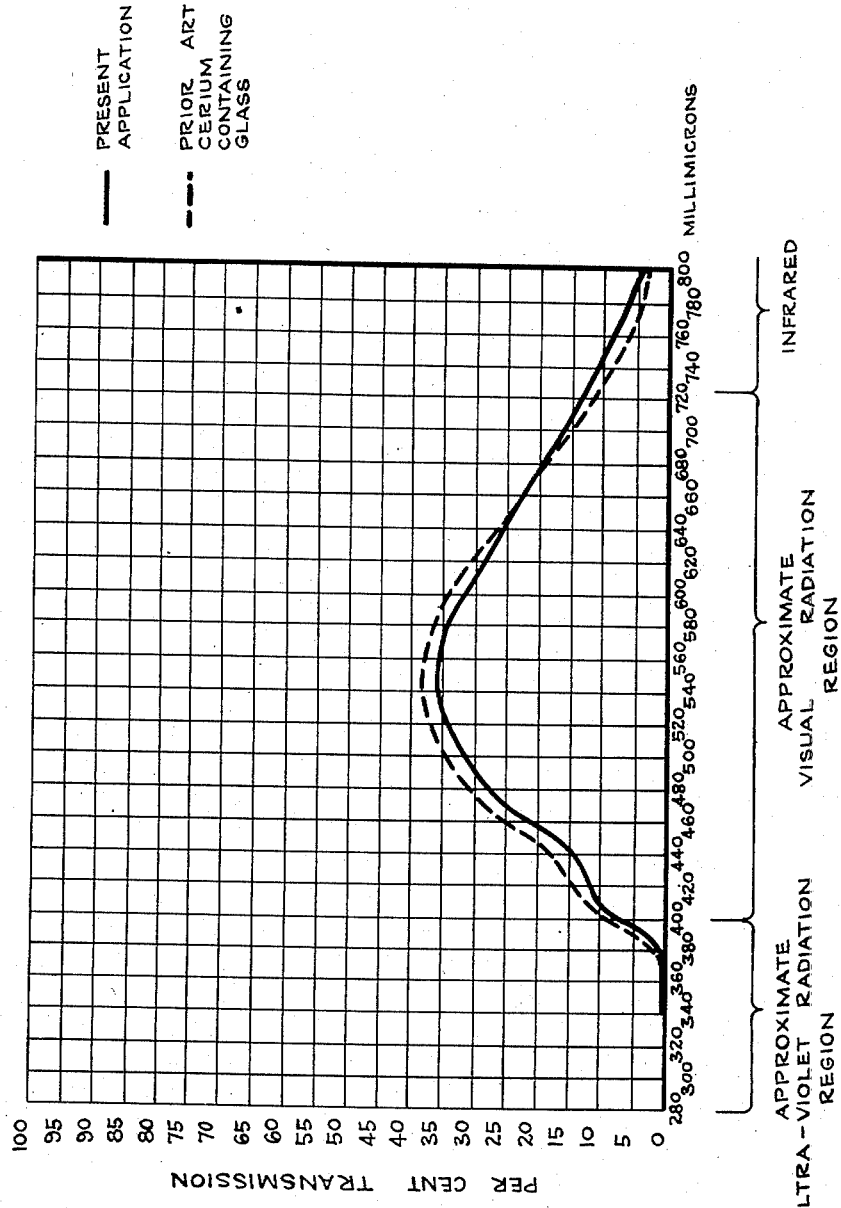
Figure 2:
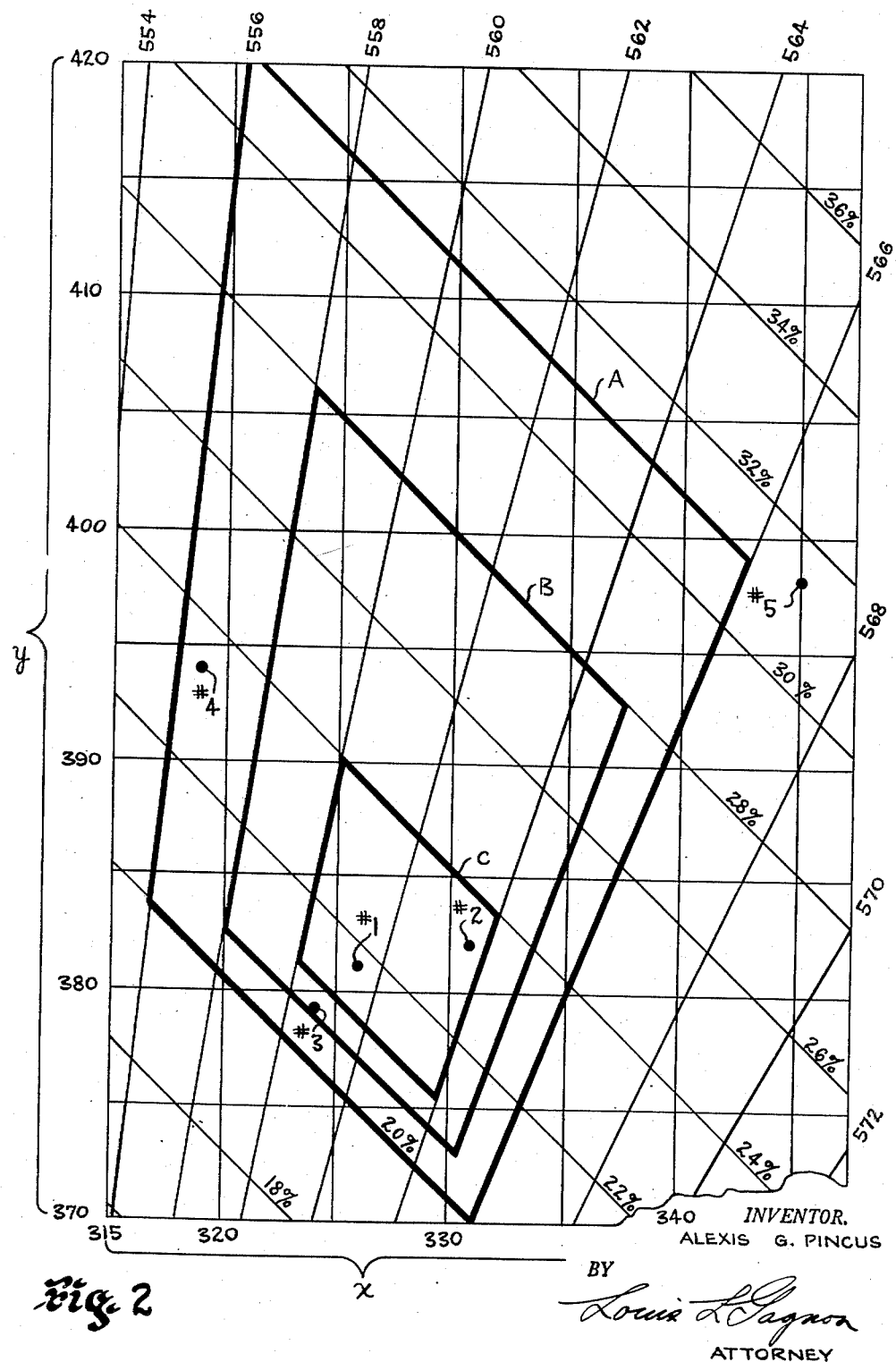

Referring to the attached drawings, Fig. 1 illustrates a typical spectral transmission curve of a glass produced according to the present teachings and a similar transmission curve of a common type of cerium containing glass; and Fig. 2 is a chromaticity diagram taken from a standard text such as A. C. Hardy, "Handbook of Colorimetry," published by Technology Press, Cambridge, Mass. (1936) and specifies colors described by means of standard observer and coordinate system adopted in 1931 by the international Commission on Illumination.

In carrying out the present invention, it has been found that glasses having the following approximate chemical analyses have produced desirable results:

TABLE A

| Ingredients | Specific Example Parts by Weight | Range Parts by Weight |
|---|---|---|
| Silica ($SiO_2$) | 70.3 | [1] 67–70 |
| Soda ($Na_2O$) | 6.6 | [1] 0–17 |
| Potash ($K_2O$) | 10.7 | [1] 0–17 |
| Lime (CaO) | 7.0 | [1] 4–13 |
| Chlorine ($Cl_2$) | 0.6 | [1] 0–1 |
| Sulphur Trioxide ($SO_3$) | 0.6 | [1] 0–1.5 |
| Arsenic Trioxide ($As_2O_3$) | 0.4 | [1] 0–1.0 |
| Iron Oxides (expressed as $Fe_2O_3$) | 3.6 | [1] 1.5–6.5 |
| Vanadium Oxides (expressed as $V_2O_5$) | 0.2 | [1] 0.05–0.8 |

[1] Approximately.

It is to be understood that the iron oxide content is controlled according to the absorptive characteristics and color desired and that chromium oxide ($Cr_2O_3$) may be substituted entirely for the vanadium oxide ($V_2O_5$) or combinations thereof might be used. It has been found in a specific batch, such as given above, that when substituting chromium oxide ($Cr_2O_3$) for the vanadium oxide ($V_2O_5$) that the content expressed as chromium oxide can be 0.05 instead of 0.2 as given for the vanadium oxide. Chromium oxide ($Cr_2O_3$) can be included in amounts ranging from 0.01 to 0.2 part by weight. When both vanadium oxide and chromium oxide are introduced in the same formula, the best results are secured with 0.1 to 0.2 part by weight $V_2O_5$ and 0.05 to 0.1 part by weight ($Cr_2O_3$), although $V_2O_5$ can be included in amounts ranging from 0.1 to 0.8 part by weight with the addition of from 0.05 to 0.2 part by weight $Cr_2O_3$.

Table B which follows shows the results of several batches melted in a base corresponding to the specific examples of Table A except that iron oxides were 4.8%, each batch having varying amounts of $V_2O_5$ and $Cr_2O_3$ with the figures being computed from glasses produced by each individual melt at a thickness of approximately 2 millimeters.

TABLE B

| Per Cent $V_2O_5$ | Per Cent $Cr_2O_3$ | Per Cent U. V. Trans. | Per Cent T. E. Trans. | Per Cent Visual Trans. |
|---|---|---|---|---|
| | | $M\mu$. | | |
| 0.1 | 0.05 | 392 | 7 | 33½ |
| 0.1 | 0.1 | 390 | 6½ | 32 |
| 0.1 | 0.2 | 391 | 6 | 29 |
| 0.1 | 0.4 | 394 | 12 | 29 |
| 0.4 | 0.05 | 393 | 6 | 30 |
| 0.4 | 0.1 | 394 | 5 | 27 |
| 0.4 | 0.2 | 396 | 7 | 26 |
| 0.4 | 0.4 | 399 | 14½ | 26 |
| 0.8 | 0.05 | 402 | 7 | 25 |
| 0.8 | 0.1 | 410 | 10½ | 26 |
| 0.8 | 0.2 | 450 | 8½ | 22 |
| 0.8 | 0.4 | 468 | 14 | 22 |

For convenience, the formulas for the iron, vanadium, and chromium oxides are given for a specific valence but it is to be understood that in the glass as formed, there will be present several different valences depending upon the resultant characteristics desired for the glass. The iron, for example, will be in both the ferric and ferrous forms, the ferric form introducing the ultra-violet absorption and the ferrous the infra-red absorption with the relative proportion of each controlled in the manner described below so as to maintain the color within the desired tolerances. The vanadium can be present in the valences of 3, 4 and 5 and the chromium can be present in the valences of 3 and 6. In the valence of three vanadium produces a pale green color and a relatively slight infra-red absorption, in the valence of four it has no significant absorptive effects, and in the valence of five it strongly absorbs ultra-violet. When properly combined in a glass with iron, vanadium increases the ultra-violet absorption for a given visual transmission, and makes possible a green color within the desired limits to match prior art cerium-iron glasses which approximate the eye sensitivity curve so that colors viewed through such glasses are not changed in hue as illustrated in Fig. 1. By controlling the atmosphere within the furnace and within the batch by means of suitable reducing agents, such as carbon, phosphorus, silicon, sugar and others well known in the art, it is possible to balance the relative valances of these ingredients so as to obtain the desired shade of color and absorptive properties.

The temperature employed in melting the glass batch and which has produced desirable results, is preferably approximately 2600° F. but can be varied between 2450° and 2750° F. without appreciably effecting the resultant color as this glass has the novel advantage of not being as sensitive to changes in temperature and time of heating as has been found to be the case with other known commercial colored glasses, particularly the iron-cerium green glasses. It is due to this particular characteristic that applicant is able to more readily control the color of successive glass melts and thereby obtain greater uniformity of color of the resultant glass. Furthermore the homogeneity of the color within any single melt is superior with the iron-vanadium and iron-chromium glasses here taught than with prior art iron or iron-cerium glasses.

Glasses formed in accordance with the teachings set forth above have an index of refraction of approximately 1.523, and the index of refraction may be controlled and readjusted by varying the relative proportions of silica, alkalis, and lime plus iron oxide, with the index increasing as the proportion of lime and iron oxide increases and vice versa, as illustrated by the following Table C in which the initial composition corresponds with that given in the specific example of Table A:

TABLE C

Introducing 1.5% CaO for 1.5% $SiO_2$ results in 1.530 ND
Introducing 1.5% $SiO_2$ for 1.5% CaO results in 1.521 ND
Introducing 1.5% $Na_2O$ for 1.5% $SiO_2$ results in 1.528 ND
Introducing 1.5% $SiO_2$ for 1.5% $Na_2O$ results in 1.522 ND
Introducing 2.0% $Na_2O$ for 2.0% CaO results in 1.523 ND
Introducing 2.0% CaO for 2.0% $Na_2O$ results in 1.529 ND
Introducing 2.0% $K_2O$ for 2.0% CaO results in 1.521 ND
Introducing 2.0% CaO for 2.0% $K_2O$ results in 1.531 ND Glasses resulting from the above teachings produce extremely desirable results in that they are readily fusible with commercially known ophthalmic flint, barium crown and crown glasses which is of extreme importance, particularly in forming, for example, fused multifocal lenses, color wedges or the like.

Another desirable feature is that the glasses may be readily reworked without introducing devitrification and may be readily fused to other glasses such as commersially known ophthalmic flint, barium crown, and crown glasses without danger of devitrification throughout the contigious surfaces of the joined glasses.

The control of the index of refraction of the glass whereby the resultant glass will have an index of refraction of approximately 1.523 is of extreme importance in the art, particularly in the art of forming ophthalmic lenses wherein differently curved surfaces are produced by tools commercially known as laps. These laps are provided with a series of different curvatures computed according to the index of refraction of the glass with which they are to be used. Such tools are part of the present standard equipment of dispensers of ophthalmic products, particularly lenses, who use these tools in forming what is known as prescriptive surfaces on lens blanks and in view of the fact that the tools have their various curved surfaces computed for use for a glass having an index of refraction of 1.523, it renders the glass of the present invention particularly desirable in that it can be controlled so as to have an index of refraction of this value.

Although the specific ranges of temperature have been given above, it is to be understood that other controlling factors must be taken into consideration, for example, the atmosphere as determined by the conditions within the furnace above the glass melt and within the glass melt itself. The exact addition of reducing agents needed to obtain the desired color and absorptive property will be determined by a number of conditions which will vary from factory to factory and from furnace to furnace depending upon the fuel used, the atmosphere maintained above the melt, the size and the design of the furnace, the draft on the furnace, and the scale of the operation. The suitable addition of reducing agents would have to be worked out for each particular condition. However, it has been found in experimental laboratory melts that to obtain the desired color and absorptive characteristics, an addition of one-tenth of a per cent of powdered carbon is approximately correct for an electrically heated furnace with a slightly oxidizing atmosphere and for melts on a scale of one pound or less and with the temperature controlled approximately at 2600° F. for about two hours.

When arsenic oxide is added to the above batch, with all other conditions being the same, the carbon content has to be increased to compensate for the oxidizing effect of the arsenic upon the ferrous iron. For an addition of 0.35% arsenic which was found to be useful for improving the melting rate and homogenity of the glass it was found necessary to increase the carbon addition to 0.2%. As the scale of the melting increased it was found that the amount of carbon addition required decreased due to improved retention of the carbon within the larger volume. Table D set forth below presents actual transmission data obtained on a set of glasses of approximately 2 millimeters thickness in which the carbon content was varied from 0.15 to 0.30% for varying vanadium oxide contents between 0.2 and 1.6% maintaining iron oxide at 4.8% with other conditions the same.

TABLE D

| $V_2O_5$ Content | Carbon Content | 5% U-V Trans. | Tot. Energy Trans. | Visual Trans. |
|---|---|---|---|---|
| Per cent | Per cent | Mu | Per cent | Per cent |
| 0.2 | 0.15 | 394 | 9 | 34 |
| 0.2 | 0.30 | 390 | 2 | 27 |
| 0.4 | 0.15 | 400 | 13 | 32 |
| 0.4 | 0.30 | 394 | 3 | 24 |
| 0.8 | 0.15 | 407 | 16 | 32 |
| 0.8 | 0.30 | 430 | 2½ | 19 |
| 1.6 | 0.15 | 448 | 24 | 26 |
| 1.6 | 0.30 | 454 | 7 | 17 |

It has been stated above that one of the desired features of the present invention is the obtaining of a glass having a green color which is particularly that of a known commercial cerium-iron glass now in common use in the trade. The particular green shade desired is obtained through the control of the upper limit of the blue and yellow transmission of the glass. If during the melting, conditions are too reducing, the color becomes too blue a green; if too oxidizing, it becomes too yellow a green and it is important that it be possible to control the color within established blue-green and yellow-green limits. These can be specified in terms of the I. C. I. coordinates as follows:

For a glass of shade designated in the trade as C Shade green absorptive glass, the dominant wavelength can be varied between 556 at the blue limit to 564 at the yellow limit depending upon the resultant green color desired. The purity of the color can be varied between 10% and 18%. The brightness can be varied between approximately 48% and 55%.

In addition to the color specifications set forth above the transmission of ultra-violet and infra-red radiation may also be specified as follows:

| Shade | 5% U. V. Transmission at | Per Cent Total Energy Transmission |
|---|---|---|
| | Mmu. | |
| B | 372–380 | less than 35 |
| C | 372–390 | less than 20 |
| D | 380–400 | less than 10 |

Referring to Figure 2, area A indicates the broadest range of colors which may be produced satisfactorily in accordance with the presently described procedure.

Area B refers to a narrower range of acceptable colors within the scope of the present invention, and area C refers to a specific preferable range of color.

The dominant wavelength of the desired and acceptable color range can be varied from approximately 556 to 566 millimicrons inclusive, as indicated in area A, although it has been found that as the dominant wavelength approaches 566 millimicrons the color tint tends to become too yellow and as the dominant wavelength approaches 556 millimicrons it tends to become too blue by present standards. Therefore, there is also included in Figure 2 the intermediate area B in which the dominant wavelength is limited to a range between approximately 558 and 565 millimicrons. The preferable range indicated by area C has an approximate dominant wavelength of 560 to 564 millimicrons. The purity property is shown to vary in the broad area A between the values of 20–31%. In the intermediate area B it varies between 20.5–28%, while in the narrow area C it varies between approximately 21–24%.

Table E which follows summarizes all of the color specification data by the I. C. L. system, including that reproduced on the chromaticity diagram in Figure 2. The glass indicated by #1 in Figure 2 describes the color obtained by small scale melts in accordance with foregoing teachings. Although glasses of the preferred colors are indicated in Figure 2 by #1 and #2, desirable colors are obtainable within the scope of the present invention by varying the batch mixes and/or melting conditions, as previously outlined. The colors obtained in these instances would fall within the areas A or B. All glasses having these color characteristics would also possess the desired ultra-violet and energy transmission characteristics if produced in accordance with the present teachings.

The brightness varies between 32 and 40%. Of course, if other shades are desired, they can be obtained by following the above teachings as to control of the degree of reduction and principally by control of the total iron oxides content. For a D shade the iron oxide content must be approximately 4.7 percent, for a C shade approximately 3.5% and for a B shade approximately 2.2%. The last yields glasses with approximately 63 to 70% brightness or visual transmission. As reduction is made stronger, the glasses become bluer and lower in visual transmission for a given iron oxides content but to meet the specifications for dominant wavelength and purity they have to fall within the brightness limits specified.

Glasses #1 and #2 are prior art green glasses, the colors and transmission characteristics of which have been duplicated by procedures outlined hereinbefore. Glass #3 is within the intermediate range, glass #4 is within the broad but acceptable range, while glass #5 is an example of a glass which is not generally regarded as acceptable since it possesses too much of a yellow tint.

All of the acceptable glasses #1–4 meet the ultra-violet, total energy, and visual transmission requirements and desired indices of refraction, as well as other desirable characteristics recited hereinbefore.

All of the above glasses #1–5 have been actually produced according to the teachings of the present invention but it is to be understood that many other glasses have been produced according to these teachings which fall within the areas defined in Fig. 2.

In Table E which follows, all data is given in terms of the standard I. C. I. Illuminant C representative of average daylight of a standard observer and of a glass thickness of 2 millimeters. XYZ are the tristimulus values of the I. C. I. coordinate system and $xyz$ are the trichromatic coefficients derived from the XYZ tristimulus values by dividing their sums into the individual values. Therefore, $x+y+z=1.000$. Therefore, if any two of the trichromatic coefficients are specified the third one is fixed. Lamda ($\lambda$) refers to the dominant wavelength obtained from a chart of the type presented in Figure 3 and which is standard in color specifications. $p$ is the excitation purity expressed in per cent, while B indicates brightness in per cent, B being so defined as to be identical with the tristimulus value X.

TABLE E

*Illuminant C thickness 2 m./m.*

| | | | |
|---|---|---|---|
| Glass #1 | X=0.305<br>Y=0.357<br>Z=0.275<br>X+Y+Z=0.937 | x=0.326<br>y=0.381<br>z=0.293 | λ=561 mmu.<br>p=21.7%.<br>B=35.7%. |
| Glass #2 | X=0.332<br>Y=0.383<br>Z=0.288<br>X+Y+Z=1.003 | x=0.331<br>y=0.382<br>z=0.287 | λ=564 mmu<br>p=23.3%.<br>B=38.3%. |
| Glass #3 | X=0.308<br>Y=0.360<br>Z=0.282<br>X+Y+Z=0.950 | x=0.324<br>y=0.379<br>z=0.297 | λ=561 mmu.<br>p=20.6%.<br>B=36.0%. |
| Glass #4 | X=0.197<br>Y=0.243<br>Z=0.177<br>X+Y+Z=0.617 | x=0.319<br>y=0.394<br>z=0.287 | λ=557 mmu.<br>p=23.4%.<br>B=24.3%. |
| Glass #5 | X=0.338<br>Y=0.390<br>Z=0.252<br>X+Y+Z=0.980 | x=0.345<br>y=0.398<br>z=0.257 | λ=567 mmu.<br>p=31.3%.<br>B=39.0%. |

For the specific examples set forth in Fig. 2 and representing D shade glasses actually made, the ultra-violet transmissions and total energy transmissions actually were found to be:

| Per Cent Visual Trans. | Glass No. | 5% U. V. Trans. at | Per Cent Total Energy Trans. |
|---|---|---|---|
| 38 | #1 | 394 | 7 |
| 36 | #2 | 394 | 8½ |
| 35 | #3 | 394 | 6½ |
| 23 | #4 | 394 | 2 |
| 37 | #5 | 394 | 13 |

From the above teachings, a glass can be produced which may be controlled as to index of refraction, ultra-violet absorption, total energy transmission, visual transmission, and desirable green color, which will be fusible with all regular ophthalmic crown, barium, or flint glasses, and which is capable of being produced by ordinary glass factory methods. This has been accomplished by combining controlled amounts of iron oxides with vanadium and/or chromium in a soda-potash-lime-silica base crown glass and by melting with the temperature-time cycles given herein.

The glass batch formulas, final analysis, transmission curves, and percentages given above are by way of illustration only and should not be limitive of the invention except insofar as they are specifically recited in the appended claims.

From the foregoing it will be seen that I have produced means and methods of a simple and efficient nature that will produce all of the objects and advantages of the present invention.

I claim:

1. An infra-red and ultra-violet absorbing glass having its dominant wave length of transmission adjacent the middle part of the visible region of the spectrum, with its transmission characteristics for wave lengths on each side of said dominant wave length progressively decreasing to substantially complete absorption in the ultra-violet and infra-red regions, said glass consisting of a silica-soda-potash-lime base combined with from about 1.5 to 6.5 per cent by weight of a mixture of ferric and ferrous oxides and a small fraction of one per cent of a metal oxide selected from the group consisting of vanadium oxides, chromium oxides and mixtures thereof, the silica content comprising the predominant constituent of the glass.

2. An infra-red and ultra-violet absorbing glass having its dominant wave length of transmission in the visible region of the spectrum between 556 and 566, with its transmission characteristics for wave lengths on each side of said dominant wave length progressively decreasing to substantially complete absorption in the ultra-violet and infra-red regions, said glass consisting of a silica-soda-potash-lime base combined with from about 1.5 to 6.5 per cent by weight of iron oxides and a small fraction of one per cent of a metal oxide selected from the group consisting of vanadium oxides, chromium oxides and mixtures thereof, said glass consisting predominantly of silica and with the iron oxides being in both ferric and ferrous forms, the ratio of said forms of iron oxide and the metal oxide of said group introducing said transmission characteristics to the glass.

3. An infra-red and ultra-violet absorbing glass having its dominant wave length of transmission in the visible region of the spectrum between 558 and 565, with its transmission characteristics for wave lengths on each side of said dominant wave length progressively decreasing to substantially complete absorption in the ultra-violet and infra-red regions, said glass consisting of a silica-soda-potash-lime base combined with from about 1.5 to 6.5 per cent by weight of iron oxides and from about .2 to 1.6 per cent of vanadium oxides, said glass comprising predominantly of silica and with the iron oxides being in both ferric and ferrous forms, the ratio of said forms of iron oxide and the vanadium oxides introducing said transmission characteristics to the glass.

4. An infra-red and ultra-violet absorbing glass having its dominant wave length of transmission in the visible region of the spectrum between 558 and 565, with its transmission characteristics for wave lengths on each side of said dominant wave length progressively decreasing to substantially complete absorption in the ultra-violet and infra-red regions, said glass consisting of a silica-soda-potash-lime base combined with from about 1.5 to 6.5 per cent by weight of iron oxides and from about .01 to .2 per cent of chromium oxides, said glass consisting predominantly of silica and with the iron oxides being in both ferric and ferrous forms, the ratio of said forms of iron oxide and the chromium oxides introducing said transmission characteristics to the glass.

5. An infra-red and ultra-violet absorbing glass having its dominant wave length of transmission adjacent the middle part of the visible region of the spectrum with its transmission characteristics on each side of said dominant wavelength of transmission progressively decreasing to substantially complete absorption adjacent the infra-red and ultra-violet regions, said glass consisting of a silica-soda-potash lime base combined with from about 1.5 to 6.5 per cent by weight of a mixture of ferric and ferrous oxides and from about .05 to .8 per cent of vanadium oxides, the silica content comprising the predominant constituent of said glass.

6. An infra-red and ultra-violet absorbing glass having its dominant wave length of transmission adjacent the middle part of the visible region of the spectrum with its transmission characteristics on each side of said dominant wavelength of transmission progressively decreasing to substantially complete absorption adjacent the infra-red and ultra-violet regions, said glass consisting of a silica-soda-potash-lime base combined with from about 1.5 to 6.5 per cent by weight of a mixture of ferric and ferrous oxides and from about .01 to .2 per cent of chromium oxides, the silica content comprising the predominant constituent of said glass.

7. An infra-red and ultra-violet absorbing glass having its dominant wave length of transmission adjacent the middle part of the visible region of the spectrum with its transmission characteristics on each side of said dominant wavelength of transmission progressively decreasing to substantially complete absorption adjacent the infra-red and ultra-violet regions, said glass consisting of a silica-soda-potash-lime base combined with from about 1.5 to 6.5 per cent by weight of a mixture of ferric and ferrous oxides, from about .1 to .2 per cent of vanadium oxides and from about .05 to .1 per cent of chromium oxides, the silica content comprising the predominant constituent of said glass.

8. An infra-red and ultra-violet absorbing glass having its dominant wave length of transmission adjacent the middle part of the visible region of the spectrum with its transmission characteristics on each side of said dominant wavelength of transmission progressively decreasing to substantially complete absorption adjacent the infra-red and ultra-violet regions, said glass consisting of a silica-soda-potash-lime base combined with from about 1.5 to 6.5 per cent by weight of a mixture of ferric and ferrous oxides, from about .01 to .8 per cent of vanadium oxides and from about .05 to .2 chromium oxides, the silica content comprising the predominant constituent of said glass.

9. In the process of forming an infra-red and ultra-violet absorbing glass having a controlled transmission in the visible region of the spectrum, the steps comprising adding to a conventional silica predominating glass batch from 1.5 to 6.5 per cent by weight of iron oxides and a fraction of one per cent of a metal oxide from the group consisting of the oxides of vanadium, chromium and mixtures thereof, and melting said batch under a reducing atmosphere such as to cause said iron oxides to assume both ferric and ferrous forms, and controlling the proportions of the metal oxide and ratio of ferric and ferrous forms of iron oxide to produce a glass having its greatest transmission at a wave length adjacent the middle part of the visible region of the spectrum and with its transmission progressively decreasing for successive wave lengths on opposed sides of said wave length of greatest transmission to substantially complete absorption at the infra-red and ultra-violet regions.

10. In the process of forming an infra-red and ultra-violet absorbing glass having a controlled transmission in the visible region of the spectrum, the steps comprising adding to a conventional silica predominating glass batch from 1.5 to 6.5 per cent by weight of iron oxides and a fraction of one per cent of a metal oxide from the group consisting of the oxides of vanadium, chromium and mixtures thereof, and melting said batch under a reducing atmosphere at a temperature from 2450 to 2750° F. such as to cause said iron oxides to assume ferric and ferrous forms and in such ratios that with the proportion of metal oxide included in the batch a glass will be produced having its greatest transmission at a wave length adjacent the middle part of the visible region of the spectrum and its transmission progressively decreasing for successive wave lengths on opposed sides of said wave length of greatest transmission to substantially complete absorption at the infra-red and ultra-violet regions.

11. An infra-red and ultra-violet absorbing glass of the character described, said glass consisting of a silica-soda-potash-lime base combined with from about 1.5 to 6.5 per cent by weight of a mixture of ferric and ferrous oxides, from about 0.1 to .8% of vanadium oxides, and from about .05 to .2% of chromium oxides, the silica comprising roughly two-thirds of the composition, and said glass having its dominant wavelength of transmission for light in the visible region of the spectrum between about 558 and 565 millimicrons, and with its transmission characteristic for wavelengths on opposed sides of said dominant wavelength progressively decreasing in value to substantially complete absorption adjacent the outer limits of said visible region of the spectrum.

12. An infra-red and ultra-violet absorbing glass of the character described, said glass having a chemical analysis by weight consisting essentially of silica from about 67 to 70%, soda not exceeding approximately 17%, potash not exceeding approximately 17%, lime from approximately 4 to 13%, a mixture of ferrous and ferric oxides from approximately 1.5 to about 6.5%, vanadium oxides from about 0.05 to 0.8%, and containing minor amounts of fining agent, said glass having its dominant wavelength of transmission in the visible region between 558 and 565 millimicrons and its transmission characteristics for wavelengths on each side of said dominant wavelength progressively decreasing to substantially complete absorption adjacent the infra-red and ultra-violet regions.

13. An infra-red and ultra-violet absorbing glass of the character described, said glass having a chemical analysis by weight consisting essentially of silica from about 56 to 70%, soda not exceeding approximately 17%, potash not exceeding approximately 17%, lime from approximately 4 to 13%, a mixture of ferrous and ferric oxides from approximately 1.5 to about 6.5%, chromium oxides from about .01 to 0.2%, and containing minor amounts of fining agent, said glass having its dominant wavelength of transmission in the visible region between 558 and 565 millimicrons, its transmission characteristics for wavelengths on each side of said dominant wavelength progressively decreasing to substantially complete absorption adjacent the infra-red and ultra-violet regions.

14. An infra-red and ultra-violet absorbing glass of the character described, said glass having a chemical analysis by weight consisting essentially of silica about 70.3%, soda about 6.6%, potash about 10%, lime about 7%, a mixture of ferrous and ferric oxides about 3.6%, vanadium oxides about .2%, chlorine about 0.6%, sulphur trioxide about 0.6% and arsenic trioxide about 0.4%, said glass having its dominant wavelength of transmission in the visible region between 558 and 565 millicrons, its transmission characteristics for wavelengths on each side of said dominant wavelength progressively decreasing to substantially complete absorption adjacent the infra-red and ultra-violet regions.

15. An infra-red and ultra-violet absorbing glass of the character described, said glass having a chemical analysis by weight consisting essentially of silica about 70.3%, soda about 6.6%, potash about 10.7%, lime about 7%, a mixture of ferrous and ferric oxides about 3.6%, chromium oxides about .05%, chlorine about 0.6%, sulphur trioxide about 0.6% and arsenic trioxide about 0.4%, said glass having its dominant wavelength of transmission in the visible region between 558 and 565 millimicrons, its transmission characteristics for wavelengths on each side of said dominant wavelength progressively decreasing to substantially complete absorption adjacent the infra-red and ultra-violet regions.

ALEXIS G. PINCUS.

REFERENCES CITED

The following references are of record in the file of this patent:

UNITED STATES PATENTS

| Number | Name | Date |
|---|---|---|
| 2,219,122 | Weidert et al. | Oct. 22, 1940 |
| 2,226,418 | Tillyer et al. | Dec. 24, 1940 |
| 2,278,501 | Tillyer et al. | Apr. 7, 1942 |

FOREIGN PATENTS

| Number | Country | Date |
|---|---|---|
| 97,389 | Australia | 1924 |
| 263,410 | Great Britain | 1926 |